(12) United States Patent
Ankner et al.

(10) Patent No.: US 6,436,309 B1
(45) Date of Patent: Aug. 20, 2002

(54) POLYOL AND COMPLEX ESTERS FOR USE WITH, IN PARTICULAR, FLUORINATED REFRIGERANTS

(75) Inventors: Kjell Ankner, Mölnlycke; Håkan Rahkola, Stora Höga, both of (SE); Jari Koistinen, Jyväskylä (FI); Essi Glad, Porvoo (FI); Virpi Saranpää, Helsinki (FI)

(73) Assignee: Fortum Oil and Gas Oy, Fortum (FI)

( * ) Notice: Subject to any disclaimer, the term of this patent is extended or adjusted under 35 U.S.C. 154(b) by 0 days.

(21) Appl. No.: 09/402,548

(22) PCT Filed: Apr. 8, 1998

(86) PCT No.: PCT/FI98/00313

§ 371 (c)(1),
(2), (4) Date: Jan. 10, 2000

(87) PCT Pub. No.: WO98/46704

PCT Pub. Date: Oct. 22, 1998

(30) Foreign Application Priority Data

Apr. 11, 1997 (FI) .................................................. 971549

(51) Int. Cl.$^7$ .................... C10M 105/35; C10M 105/32
(52) U.S. Cl. ........................... 252/68; 508/485; 508/590
(58) Field of Search ..................... 252/67, 68; 508/485, 508/490

(56) References Cited

U.S. PATENT DOCUMENTS 5,374,366 A * 12/1994 Nakahara et al.

FOREIGN PATENT DOCUMENTS

| EP | 415778 | * 3/1991 |
| EP | 435253 | * 7/1991 |
| WO | 9749786 | * 12/1997 |

OTHER PUBLICATIONS

Dialog Information Services, File 351, Dialog accession No. 009792349, WPI accession No. 94–072202/09, KAO Corp., Abstract of JP 6025683 2/94.*

* cited by examiner

*Primary Examiner*—Margaret Einsmann
(74) *Attorney, Agent, or Firm*—Birch Stewart Kolasch & Birch, LLP.

(57) ABSTRACT

The invention concerns a refrigerant composition which comprises a chlorine-free hydrofluorocarbon based refrigerant and, mixed with the refrigerant, a lubricant comprising a polyol ester. According to the invention the polyol ester comprises an ester of 2-butyl-2-ethyl-1,3-propane diol, the carboxylic acid residue of which is derived from a linear or branched $C_4$ ... $C_8$-carboxylic acid or an anhydride thereof, or it is derived from a mixture of linear or branched $C_4$ ... $C_{18}$-carboxylic acids or anhydrides thereof. The present invention also concerns novel complex esters of 2-butyl-2-ethyl-1,3-propanediol, which contain residues of mono- or bivalent carboxylic acids. The novel esters exhibit good solubility in fluorinated hydrocarbons and excellent lubricating properties.

13 Claims, No Drawings

POLYOL AND COMPLEX ESTERS FOR USE WITH, IN PARTICULAR, FLUORINATED REFRIGERANTS

This application is the national phase under 35 U.S.C. §371 of PCT International Application No. PCT/FI98/003 13 which has an International filing date of Apr. 8, 1998 which designated the United States of America.

The present invention concerns a refrigerant composition according to the preamble of claim 1. A composition of this kind generally contains a non-chlorinated hydrofluorocarbon based refrigerant composition together with a polyol ester based lubricant mixed therewith.

The invention also concerns complex esters according to claim 12 and lubricants containing these esters.

Lately, as a result of development in many fields of application, the evolution of polyolester type lubricants has been rapid. These products can be used as such or mixed with another base oil, such as a hydrocarbon, in engine oils for automotives, in aeroplane and gas turbine oils, as biodegradable hydraulic oils, as metal working oils and as compressor oils. These products are used in particular together with fluorinated refrigerants as a soluble lubricant component in refrigeration compressors due to their advantageous solubility properties, good technical stability and good cold properties.

The use of neopentylglycol and pentaerythritol esters together with refrigerants has been generally suggested. Although these known esters in principle exhibit good lubricant properties, their solubility in non-chlorinated hydrofluorocarbons is often only fair. For this reason they do not work well enough in refrigerant compositions containing fluorinated hydrocarbons.

It is an object of the present invention to eliminate the problems of the prior art and to provide polyol and complex esters of a novel kind which can be used in particular together with fluorinated refrigerant liquids as lubricants. It is another object of the invention to provide novel esters which are generally suited to the use as base oils of lubricants.

The present invention is based on the finding that esters of 2-butyl-2-ethyl-1,3-propanediol have good lubricant properties in particular due to their chemical form. These esters exhibit the neopentyl structure typical for lubricants; the substitution of the carbon in position 2 is, however, asymmetric, i.e. the substituents are different, and because of this these esters have properties which differ from the usual properties. The esters of BEPD are hydrolytically very stable. They have good lubricant properties, they are also easily or very easily dissolved in fluorinated refrigerants and therefore suitable for use as lubricants in apparatuses employing such refrigerants. The lubricant used comprises in particular a polyol or complex ester prepared from BEPD (2-butyl-2-ethyl-1,3-propanediol) as such or from a mixture of BEPD and another polyol together with a monobasic carboxylic acid or an anhydride thereof (polyol esters) or with a mixture of a monobasic or dibasic carboxylic acids (complex esters).

More specifically, the refrigerant composition according to the present invention is mainly characterized by what is stated in the characterizing part of claim 1.

Complex esters of BEPD are novel and useful as base oils of lubricant oils. The novel esters are characterized by what is stated in the characterizing part of claim 12.

The present invention provides considerable advantages. The esters of BEPD have good lubricant properties and good solubility in HFC compounds used as refrigerants. The raw materials of said oils can be produced by the economically advantageous oxo-process (hydroformulation). The properties of the oils can easily be modified depending on the application by varying the ratio of the polyols of the ester (the amount of BEPD can be 100 to 5 mol-% of the total amount of polyol), the esterifying carboxylic acid and/or the ratio between the esterifying carboxylic acids. By using branched acids the solubility can be improved and by using dibasic acids the viscosity can be raised.

In the following, the invention will be examined with the aid of a detailed description and using a number of working examples.

The present esters comprise polyol or complex esters of 2-butyl-2-ethyl-1,3-propanediol. "Polyol ester" means i.a. esters having a carboxylic group comprising an monobasic acid or an anhydride thereof. For the purpose of the present invention, the term "polyol ester" comprises generally also "complex esters" which are esters in which at least a part of the esterifying acids are dibasic. Usually both carboxylic groups of these acids react with an alcohol and yield oligomeric ester compounds, which contain at least two alcohol residues and one carboxylic acid residue. Complex esters also include esters having the carboxylic acid residue formed by a hydroxy acid containing both a hydroxyl group and a carboxylic group. The carboxylic group reacts with the polyol, whereas the hydroxyl group reacts with the carboxylic group of another carboxylic acid.

"Polyol" stands for a compound with at least two hydroxy groups. According to the present invention BEPD can be esterified alone or together with another polyol. These polyols are, e.g., NPG (neopentylglycol), HPHP (hydroxypivalyl hydroxypivalate), ETHD (2-ethyl-1,3-hexanediol), TMP (trimethylol propane), TME (trimethylol ethane), PE (pentaerythnitol), TMPD (2,2,4-trimethyl-pentanediol) and CHDM (1,4-dimetylol-cyclohexane).

Preferably the polyol ester mixtures are formed by mixing the polyols together and by esterifying the thus formed mixture in situ.

According to a first preferred embodiment of the invention, a refrigerant liquid composition is provided, comprising a polyol ester which completely or almost completely (95 mol-%, or even 100%) consists of an ester of BEPD.

According to another preferred embodiment of the present invention, a refrigerant liquid composition is provided, comprising in addition to a polyol ester of BEPD an ester of NPG, HPHP, ETHD, TMP, TME, PE, BEPD or TMPD at any ratio, typically 5:95 to 100:0. Preferably BEPD forms the main part of the polyol residue of the ester mixture, i.e. its molar amount is 50% –99.9%, usually 50–95%.

BEPD or a mixture of BEPD and some other polyol is esterified with a linear or branched $C_4$ to $C_{18}$ carboxylic acid or an anhydride thereof. As specific examples of aliphatic, linear or branched, saturated or unsaturated $C_4$–$C_{18}$-carboxylic acids which can be used for preparing the ester, the following can be mentioned:

saturated, linear $C_4$–$C_{18}$-carboxylic acids: butanoic acid (butyric acid), pentanoic acid (valeric acid), hexanoic acid (caproic acid), heptanoic acid, octanoic acid (caprylic acid), decanoic acid (capric acid), dodecanoic acid (lauric acid) and hexadecanoic acid (palmitic acid) and mixtures thereof;

saturated, branched $C_4$–$C_{18}$-carboxylic acids: isobutanoic acid, 2ethylhexanoic acid, isononanoic acid and 3,5,5-trimethylhexanoic acid;

unsaturated, linear $C_4$–$C_{18}$-carboxylic acids: 3-butenoic acid (vinylacetic acid); and unsaturated, branched $C_4$–$C_{18}$-carboxylic acids.

In the mixed esters the ratios between the various linear and branched carboxylic acids can vary within large boundaries. Typically, the linear carboxylic acid(s) is (are) present in amounts of 1 to 100 mol-%, preferably about 10 to 90 mol-% of the amount of carboxylic acids. Correspondingly, the amount of branched carboxylic acids is 99 to 1 mol-%, preferably about 90 to 10 mol-%. In particular it is possible to prepare polyesters, which contain 10 to 50 mol-% of at least one linear carboxylic acid and 90 to 50 mol-% of a branched carboxylic acid.

When polyol esters of BEPD are prepared it is preferred to select linear or branched acids containing 4 to 14 carbon atoms as esterifying carboxylic acid. Octanoic acid, 2-ethylhexanoic acid and lauric acid can be mentioned as examples.

Esterifing hydroxy acids are, e.g., hydroxypivalic acid (HPAA), lactic acid, citric acid and dimethylolpropionic acid (DMPA).

In addition to the afore-mentioned, the esterifying carboxylic acid used can comprise dibasic carboxylic acids, such as oxalic acid, malonic acid, dimethylmalonic acid, succinic acid, glutaric acid, adipic acid, sebacic acid, pimelic acid, suberic acid and azelaic acid. It is also possible to use cyclic anhydrides, such as succinic anhydride or alkyl derivaties thereof, or trimellitic anhydride. Small amounts of aromatic anhydrides, such as phthalic anhydride are also possible.

The degree of esterification of the polyols is 50 to 100%, preferably as high as possible, at least about 90%. In the complex esters the ratio between the mono- and dibasic carboxylic acids is 50:50 to 99:1.

The polyol esters/mixed esters/complex esters of BEPD or BEPD and at least another polyol can be used for preparing refrigerant compositions. These contain as a refrigerant one or several chlorine-free hydrofluorocarbon(s) (a refrigerant) in which the ester is dissolved. As specific examples of the refrigerant liquid component of the compositions, the following can be mentioned: hydrofluorocarbon 134 (1,1,2,2-tetrafluoroethane), hydrofluorocarbon 134a, hydrofluorocarbon 143 (1,1,2-trifluoroethane), hydrofluorocarbon 143a (1,1,1-trifluoroethane), hydrofluorocarbon 152 (1,2-difluoroethane) and hydrofluorocarbon 152a (1,1-difluoroethane). Of these compounds, hydrofluorocarbon 134a is generally preferred. Mixtures of hydrofluorocarbons can also be employed. Examples include hydrofluorocarbon mixture 407 (mixture of hydrocarbons 32, 125 and 134a) and hydrofluorocarbon mixture 410 (mixture of hydrocarbon 32 and 125).

Depending on application, the (kinematic) viscosity requirement for the ester is, according to ISO-standard, between 5 and 200 cSt (40° C.). Low (5–10) and intermediate (22–32) viscosities are needed for, e.g., refrigerators and other small refrigeration devices. High viscosity (46–68) compositions are used for, e.g., cooling equipment of air conditioners and extremely high viscosity is needed in large installations.

As already mentioned in the beginning, the viscosity of the prepared esters can be adjusted as desired by suitably selecting esterifying carboxylic acid components and/or by adding a further polyol to the BEPD. Thus, by using conventional linear or branched carboxylic acids ($C_4$–$C_{12}$) and, e.g., adipic acid, it is possible to prepare esters having viscosities in the range of about 15–22 cSt at 40° C. Their viscosity indeces are about 100 and pour points below –40° C. They are suitable for use in smallish cooling equipment. By increasing the amount of a branched carboxylic acid it is possible to increase the volubility of the esters. By feeding a dibasic carboxylic acid into the esterification reaction and in particular by using it together with linear or branched acids, the viscosity of the product can be increased. Mixing BEPD with another polyol before esterification makes it possible to adjust the properties of the ester as desired. Thus, to mention an example, the viscosity of the ester can in many cases be increased without impairing the solubility . The viscosity grows even in the range of high viscosity.

As examples of particularly valuable esters, the following can be mentioned:

Polyol esters of BEPD, which contain 30 to 60% linear carboxylic acid and 70 to 30 mol-% branched carboxylic acid Complex esters of BEPD which contain 1 to 10 mol-% dibasic carboxylic acid and 90 to 99 mol-% linear and/or branched monobasic carboxylic acid; and Complex esters of BEPD and NPG, which contain 4 to 30 mol-% dibasic carboxylic acid and 96 to 70 mol-% linear and/or branched monobasic carboxylic acid.

As mentioned above, the complex esters of BEPD as well as complex esters of BEPD and some other polyol, are already as such novel products which can be used in lubricant compositions for different aims. The esters work as base oil of these compositions and they form the main part thereof, i.e. more than 50 wt.-%, preferably about 80 to 100 wt.-%, of the compositions. Additives are usually employed in amounts of 0 to 20 wt.-% in the compositions for the purpose of modifying the compositions such that they are better suited for various applications. Thus, the esters are suitable not only for use in refrigerant compositions but also for all applications mentioned in the introduction of the specification.

Conventional additives which can be used in the refrigerant liquid compositions include, e.g., the following: antioxidants, antiwear agents, detergents, defoaming agents and corrosion inhibitors.

Suitable antioxidants include phenols, such as 2,6-di-t-butyl-4-methylphenol and 4,4'-methylene-bis(2,6-di-t-butylphenol); aromatic amines, such as p,pdioctylphenylamine, monooctyldiphenylamine, phenothiazine, 3,7-dioctylphenothiazine, phenyl-1-naphthylaamine, phenyl-2-naphthylamine, alkylphenyl-1-naphthatalamines and alkyl-phenyl-2-naphthal-amines, as well as sulphur-containing compounds, e.g. dithiophosphates, phosphitest, sulphides and dithio metal salts, such as benzothiazole, tin-dialkyldithiophosphates and zinc diaryldithiophosphates.

Suitable antiwear agents include, for example, phosphates, phosphate esters, phosphites, thiophosphites, e.g. zinc dialkyl dithiophosphates, zinc diaryldithiophosphates, tricresyl phosphates, chlorinated waxes, sulphurised fats and olefins, such as thiodipropionic esters, dialkyl sulphides, dialkyl polysulphides, alkylmercaptanes, dibenzothiophenes and 2,2'-dithiobis (benzothiazole); organic lead compounds, fatty acids, molybdenum complexes, such as molybdenum disulphide, halogen substituted organosilicon compounds, organic silicon compounds, borates and halogen-substituted phosphorus compounds.

As specific examples of suitable detergents, the following should be mentioned: sulphonates, aromatic sulphonic acids, which are substituted with alkyl having a long chain, phosphonates, thiophosphonates, phonolates, metal salts of alkylphenols, and alkyl sulphides.

Typical defoaming agents include silicon oils, e.g. dimethylpolysilozane and organic silicon compounds such as diethyl silicates.

Organic acids, amines, phosphates, alcohols, sulphonates and phosphites are examples of corrosion inhibitors.

The esters according to the invention are prepared by a conventional esterification reaction wherein a polyol or a mixture of polyols is (are) reacted with an acid mixture in the presence of a catalyst or without a catalyst. Various acids, such as sulphuric acid, hydro-chloric acid, p-toluene sulphonic acid, butyl titanate, tinoxide etc., are suitable catalysts for carrying out the invention. A particularly advantageous catalyst is tinoxide.

During the reaction, the polyol is reacted with the acid component by using an equivalent amount of acid, a deficient amount of acid or a surplus of acid; the excess acid amounts to typically a maximum of 10 mol-%, preferably about 0.1 to 5 mol-%, in particular about 1 mol-%. The reaction temperature is 150 to 230° C., preferably 170 to 220° C. and in particular about 190 to 210° C.

The esterification can be carried out as a batch or semi-batch process for example by adding the remaining acid later on. The most typical embodiment comprises carrying out esterification in the melt phase but it is also possible to use a hydrocarbon-type medium, such as toluene or xylene. The product is neutralized and washed. The degree of esterification of the ester product is preferably over 85%, in particular over 90% and the acid number of the ester is preferably below 0.1 mg KOH/g.

The following examples illustrate the invention. They do not, however, limit the scope of the invention.

In Tables 1 to 3, the following abbreviations are used: kV for kinematic viscosity, VI for viscosity index and PP for pour point.

37.5 g and 2-EHA 27.5 g. The catalyst used comprised 0.16 g tinoxide. The esterification was carried out by stirring and nitrigating the reaction mixture at about 200° C. The reaction was complete wihin 7 hours.

Excess acid was neutralized from the reaction mixture with 2.3 g of solid sodium carbonate. In addition to sodium carbonate, 0.3 g of filtration aid was added to the reaction mixture. The neutralization was carried out at 210° C. and for 5.5 hours. The sodium carbonate and tinoxide were removed from the product by filtering. Finally the product was dried on sodium sulphate and filtered.

Esters of BEPD with other linear and branched aliphatic acids were prepared by suitably changing the conditions. The results are summarized in Table 1.

TABLE 1

Polyol esters of BEPD

| Sample | Polyol (mol-%) | Acid (mol-%) | $kV_{40° C.}$ (cSt) | $kV_{100° C.}$ (cSt) | VI | PP (° C.) | Solubility in R-134a |
|---|---|---|---|---|---|---|---|
| 1 | BEPD (100) | $C_{12}$ (50) 2-EHA (50) | 19.5 | 4.1 | 108 | −39 | Good |
| 2 | BEPD (100) | $C_{12}$ (40) 2-EHA (60) | 19.8 | 4.0 | 97 | −48 | Good |
| 3 | BEPD (100) | $C_{12}$ (30) 2-EHA (70) | 20.0 | 4.1 | 99 | −57 | Good |
| 4 | BEPD (100) | $C_{12}$ (20) 2-EHA (80) | 17.5 | 3.6 | 74 | −57 | Good |
| 5 | BEPD (100) | $C_{12}$ (10) 2-EHA (90) | 21.3 | 4.1 | 82 | −57 | Good |
| 6 | BEPD (100) | $C_{12}$ (40) $C_8$ (10) 2-EHA (50) | 19.8 | 4.8 | 173 | −48 | Good |

$C_8$ = octanoic acid
$C_{12}$ = lauric acid
2-EHA = 2-ethylhexanoic acid

EXAMPLE 1

Determination of Ester Solubility

Solubility in fluorinated hydrocarbons was determined as follows: 1 ml of the studied ester was put into a test tube which was closed with a stopper. The test tube was placed in a cold bath at a temperature of −30° C. When the temperature of the test tube and the ester had reached −30° C. (after about 5 minutes), a fluorinated refrigerant, such as R-134a, was added to make a total volume of 10 ml.

The ester-refrigerant mixture was allowed to stand in the bath at −30° C. with possibly a light occasional stirring. After about 15 minutes the mixture was visually assessed and it was determined whether the mixture contained one or two phases. If the ester and the refrigerant liquid formed one phase, the ester is completely dissolved in the refrigerant liquid. If there are two phases present in the mixture, the ester is either partially or completely insoluble in the refrigerant liquid.

EXAMPLE 2

Preparation of Esters of BEPD

The preparation of esters of BEPD is described in the following using the esters of BEDP and lauric acid and 2-EHA, respectively, as an example.

The raw materials were weighed into a glass reactor according to the following recipe: BEPD 30 g, lauric acid

EXAMPLE 3

Preparation of Complex Esters of BEPD

The preparation of complex esters of BEPD is illustrated by using the preparation of an ester of BEPD and 2-EHA and adipic acid as an example.

The raw materials were weighed into a glass reactor according to the following recipe: BEPD 27.0 g, 2-EHA 44.6 g and adipic acid 2.4 g. The catalyst used comprised 0.11 g tinoxide. The esterification was carried out under stirring and nitrigating the reaction mixture at about 200° C. The reaction was complete wihin 7 hours.

Excess acid was neutralized from the reaction mixture with 1.9 g of solid sodium carbonate. In addition to sodium carbonate 0.2 g of filtration aid was added to the reaction mixture. The neutralization was carried out at about 200° C. and for 5 hours. The sodium carbonate and tinoxide were removed from the product by filtering. Finally the product was dried on sodium sulphate and filtered.

Other complex esters were prepared by suitably changing the conditions. The results are summarized in Table 2.

TABLE 2

Complex esters of BEPD

| Sample | Polyol (mol-%) | Acid (mol-%) | $kV_{40°C.}$ (cSt) | $kV_{100°C.}$ (cSt) | VI | PP (°C.) | Solubility in R-134 |
|---|---|---|---|---|---|---|---|
| 11 | BEPD (100) | 2-EHA (95) AA (5) | 20.6 | 3.8 | 44 | −48 | Good |
| 12 | BEPD (100) | $C_{12}$ (38) 2-EHA (58) AA (4) | 27.6 | 5.2 | 117 | −48 | Good |
| 13 | BEPD (100) | $C_{12}$ (48) 2-EHA (48) AA (4) | 25.6 | 5.0 | 112 | −42 | Good |
| 14 | BEPD (100) | $C_5$ (95) AA (5) | 8.9 | 2.4 | 83 | −66 | Excellent |
| 15 | BEPD (100) | $C_{12}$ (50) 2-EHA (40) AA (10) | 36.5 | 6.4 | 128 | −42 | Good |
| 16 | BEPD (100) | $C_{12}$ (47) $C_8$ (47) AA (3) DMMA (3) | 17.7 | 4.0 | 129 | −45 | Good |
| 17 | BEPD (100) | $C_6$ (94) AA (6) | 10.6 | 2.8 | 99 | −63 | Excellent |
| 18 | BEPD | $C_5$ (85) AA (15) | 20 | 4.2 | 111 | −60 | Excellent |

$C_5$ = pentanoic acid
$C_6$ = hexanoic acid
$C_8$ = octanoic acid
$C_{12}$ = lauric acid
2-EHA = 2-ethylhexanoic acid
AA = adipic acid
DMMA = dimethylmalonic acid

EXAMPLE 4

Preparation of Polyol/Complex Esters of BEPD

By repeating the method of Example 3 complex esters of mixtures of BEPD and some other polyols were prepared. The results are summarized in Table 3.

TABLE 3

Polyol/complex esters of BEPD

| Sample | Polyol (mol-%) | Acid (mol-%) | $kV_{40°C.}$ (cSt) | $kV_{100°C.}$ (cSt) | VI | PP (°C.) | Solubility in R-134a |
|---|---|---|---|---|---|---|---|
| 19 | BEPD (90) NPG (10) | $C_{12}$ (45) 2-EHA (45) AA (10) | 40.6 | 6.0 | 90 | −42 | Good |
| 20 | BEPD (50) NPG (50) | $C_{12}$ (21) $C_{i-9}$ (43) $C_{i-4}$ (18) Succinic acid (18) | 34.9 | 5.6 | 107 | −48 | Good |
| 21 | BEPD (50) ETHD (50) | $C_{12}$ (95) AA (5) | 23.8 | 5.1 | 146 | −37 | Good |
| 22 | BEPD (50) ETHD (50) | 2-EHA (92) AA (8) | 20.3 | 3.8 | 58 | −49 | Good |
| 23 | BEPD (90) | $C_5$ (95) AA (5) | 9.6 | 2.6 | 92 | −63 | Excellent |

$C_{i-4}$ = isobutanoic acid
$C_5$ = pentanoic acid
$C_{i-9}$ = isononanoic acid
$C_{12}$ = lauric acid
2-EHA = 2-ethylhexanoic acid
AA = adipic acid

What is claimed is:

1. Refrigerant composition comprising a chlorine-free hydrofluorocarbon based refrigerant and, mixed therewith, a lubricant containing a polyol ester, characterized in that the polyol ester comprises an ester of 2-butyl-2-ethyl-1,3-propanediol, which forms at least 50 mol-% of the polyol residue of the lubricant.

2. The refrigerant composition according to claim 1, characterized in that the lubricant contains at least a second polyol ester.

3. The refrigerant composition according to claim 2, characterized in that the polyol residue of the second polyol ester is derived from neopentylglycol, hydroxypivalyl hydroxypivalate, 2-ethyl-1,3-hexanediol, trimethylolpropane, trimethylolethane, pentaerythritol or 2,2,4-trimethylpentanediol.

4. The refrigerant composition according to claim 2, characterized in that the molar ratio between the 2-1t) butyl-2-ethyl-1,3-propanediol and the other polyol is 50:50 to 99.9:0.1.

5. The refrigerant composition according claim 1, characterized in that the carboxylic acid residue of the polyol ester is derived from a linear or branched $C_4 \ldots C_8$-carboxylic acid, or anhydrides, or it is derived from mixtures of linear or branched $C_4 \ldots C_{18}$-carboxylic acids or anhydrides thereof.

6. The refrigerant composition according to claim 5, characterized in that the carboxylic acid residue is derived from 2-ethylhexanoic acid, octanoic acid and/or lauric acid.

7. The refrigerant composition according to claim 5, characterized in that the carboxylic acid residue of the ester is derived from a mixture of mono- and dibasic carboxylic acids.

8. The refrigerant composition according to claim 7, characterized in that the monobasic carboxylic acid residue is derived from linear or branched $C_4 \ldots C_{18}$-carboxylic acids or anhydrides or mixtures thereof.

9. The refrigerant composition according to claim 7, wherein the dibasic carboxylic acid residue is derived from oxalic acid, malonic acid, dimethyl malonic acid, succinic acid, glutaric acid, adipic acid, sebasic acid, pimelic acid, suberic acid, azelaic acid, or a cyclic anhydride or an alkyl derivative thereof, or trimellitic anhydride.

10. The refrigerant composition according to claim 7, characterized in that the molar ratio between the mono- and dibasic carboxylic acids is 50:50 to 99:1.

11. The refrigerant composition according to claim 1, characterized in that fluorinated hydrocarbon based refrigerant is hydrofluorocarbon 134, hydrofluorocarbon 134a, hydrofluorocarbon 143, hydrofluorocarbon 143a, hydrofluorocarbon 152 or hydrofluorocarbon 152a or a mixture of hydrofluorocarbons.

12. The refrigerant composition according to claim 9, wherein the cyclic anhydride is succinic anhydride.

13. A refrigeration composition comprising a chlorine-free hydrofluorocarbon based refrigerant and mixed therewith, a lubricant comprising a mixture of polyol esters formed by an ester of 2-butyl-2-ethyl-1,3-propanediol and at least one second polyol ester, wherein said ester of 2-butyl-2-ethyl-1,3-propanediol forms at least 50 mol-% of the polyol residue and the polyol ester mixture is formed by mixing the polyols together and by esterifying the thus formed mixture in situ.

* * * * *